United States Patent [19]

St. Cyr et al.

[11] 3,750,372

[45] Aug. 7, 1973

[54] PREVENTION OF AIR POLLUTION BY USING SOLID ADSORBENTS TO REMOVE PARTICULATES OF LESS THAN 0.5 MICRONS IN SIZE FROM FLUE GASES

[75] Inventors: Lewis A. St. Cyr, Thornton; Loren H. Young, Northglenn, both of Colo.

[73] Assignee: Vulcan Materials Company, Birmingham, Ala.

[22] Filed: Apr. 1, 1971

[21] Appl. No.: 130,398

[52] U.S. Cl. .......................................... 55/71, 55/75
[51] Int. Cl. ............................................ B01d 53/04
[58] Field of Search ..................... 55/71, 72, 74, 75, 55/387, 389; 33/98, 99, 514, 522

[56] References Cited
UNITED STATES PATENTS

| | | | |
|---|---|---|---|
| 1,741,921 | 12/1929 | Davenport | 55/387 X |
| 3,029,575 | 4/1962 | Eng et al. | 55/71 X |
| 2,973,327 | 2/1961 | Mitchell et al. | 55/389 X |
| 2,222,882 | 11/1940 | Shames | 55/74 |
| 2,207,597 | 7/1940 | Pechukas | 55/71 X |
| 3,503,184 | 3/1970 | Knapp et al. | 55/71 |

*Primary Examiner*—John Adee
*Attorney*—Burns, Doane, Swecker & Mathis

[57] ABSTRACT

Particulates less than 0.5 microns in size are removed from flue gases by passing the flue gases into intimate contact with a solid adsorbent such as calcium sulfate or zeolite A. Calcium sulfate in its anhydrous and hemihydrate forms is particularly effective in removing metal halide solids, e.g., $AlCl_3$, $KCl$, $NaCl$, and $AlF_3$, of less than 0.1 microns in size from the gaseous effluent of aluminum processing operations which utilize a gaseous chlorine treatment of molten aluminum.

15 Claims, 2 Drawing Figures

PATENTED AUG 7 1973 3,750,372
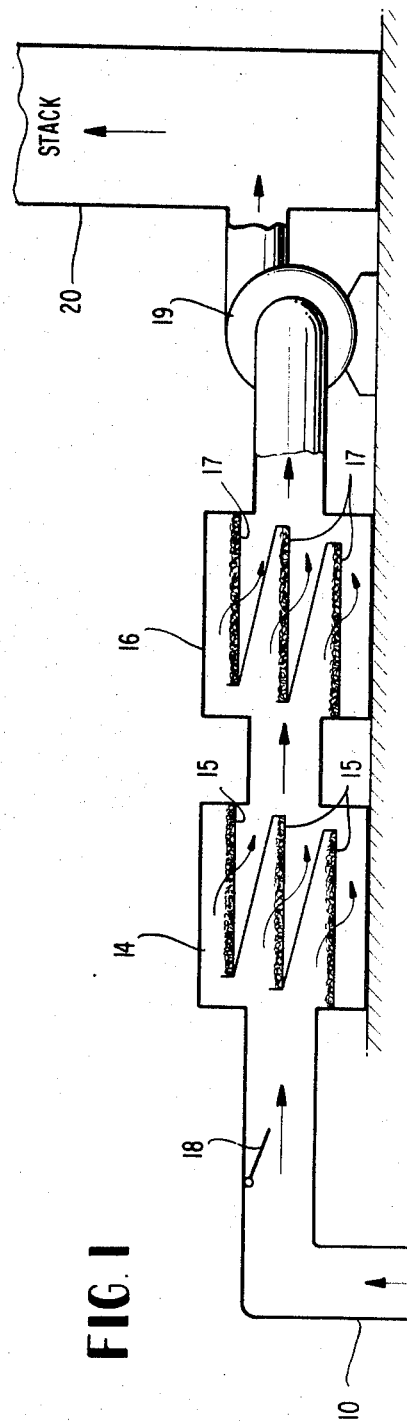
FIG. I
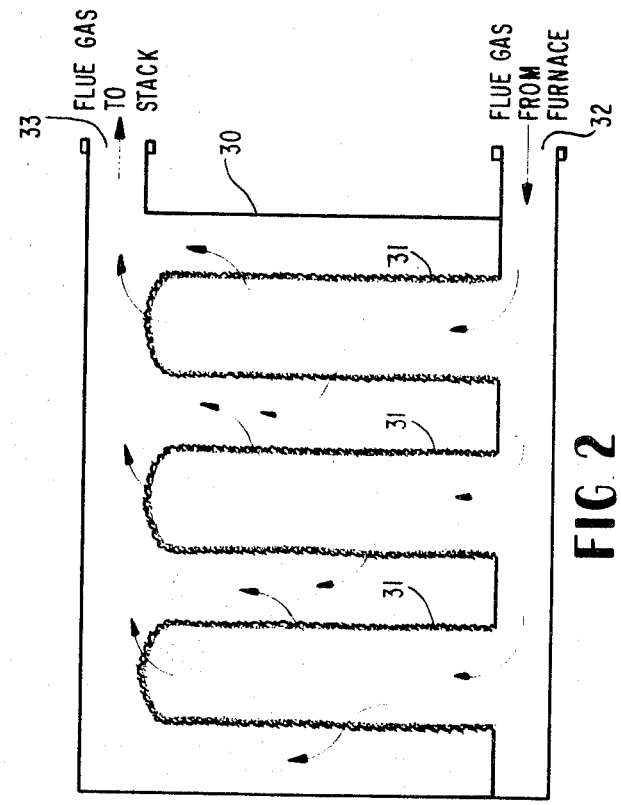
FIG. 2
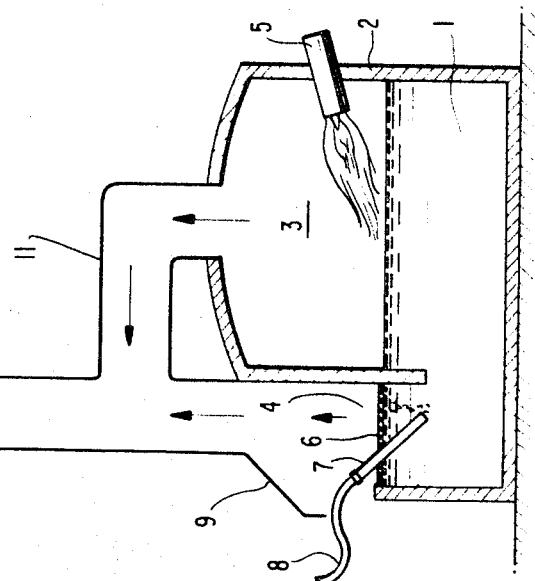
INVENTORS
LEWIS A. ST. CYR
LOREN H. YOUNG
BY Burns, Doane, Swecker & Mathis
ATTORNEYS ＃ PREVENTION OF AIR POLLUTION BY USING SOLID ADSORBENTS TO REMOVE PARTICULATES OF LESS THAN 0.5 MICRONS IN SIZE FROM FLUE GASES

BACKGROUND OF THE INVENTION

1. Field of the Invention

This invention relates to the prevention or control of air pollution. More particularly, this invention relates to processes for the removal of particulates of less than 0.5 microns from the flue gases of metal processing operations to preserve or enhance the quality of the environment of mankind.

2. State of the Art

A common environmental problem in maintaining clean air and reducing air pollution today is the flue gases or gaseous effluent from metal processing facilities.

One source of particulate contaminants is the gaseous effluent discharged into the atmosphere from aluminum processing operations. Both primary and secondary aluminum processing operations use gaseous chlorine to purify the aluminum. The chlorine combines with the impurities in aluminum to form a slag which is skimmed from the top. During chlorination, gases and particulates are released from the molten metal and may pass into the flue stack and from there into the atmosphere. Periodic fluxing of the molten metal also contributes to the release of gases and particulates. These particulates are potential air pollutants and include inorganic metal halides such as aluminum chloride, sodium chloride, potassium chloride, magnesium chloride, and aluminum fluoride. These salts of chlorine and fluorine are typically in the form of finely divided solid particles which produce a white smoke or plume of varying density at the stack, and which may generate corrosive hydrogen chloride or hydrogen fluoride when they contact humid air.

Most of the particulates in the plume vary in size down to submicron levels, many being of an aerosol or colloid particle size, i.e., less than 0.5 microns in diameter. These aerosol-sized particles are very prone to produce fog or "white smoke" by nucleation of water droplets when such particles are introduced into a humid atmosphere. Prevention of such fogs or smokes requires very high efficiency scrubbing equipment in order to remove the aerosol-sized particles.

Various methods have been adopted in the past in an attempt to remove particulates from gaseous effluents. Conventional bag filters of cotton or other textile materials have been used, but are limited by their inability to trap aerosol-sized particles. Scrubbing with caustic liquor has also been used with some success. See, e.g., Tomany, Light Metal Age, October, 1968, pp. 19–20 and 36. However, such a caustic liquor scrubbing requires very high energy inputs to obtain an adequate collection efficiency for certain of the particulates, and has not been effective in removing a significant amount of the aerosol-sized metal halide particulates. Other methods which have been suggested for the removal of entrained solids in gaseous effluents include "raining" large amounts of an inert contact material such as coke downwardly through the gaseous effluent. See, for example, U.S. Pat. No. 3,220,165. Similarly, a method of separating gaseous mixtures of metal chlorides using active carbon has been suggested. See, for example, U.S. Pat. No. 3,388,993. However, neither coke nor active carbon has been effective for removing the metal halide particulates of less than 0.5 microns in size from the gaseous effluent of aluminum processing plants. Activated alumina and calcium oxide (lime) are similarly ineffective.

SUMMARY OF THE INVENTION

Accordingly, a primary object of the present invention is to prevent or alleviate the above-discussed problems associated with the prior art.

Another object is to provide a novel process or method for the effective removal of particulates of less than 0.5 microns from gaseous effluents.

Another object of the present invention is to prevent or reduce the intensity of white smoke issuing from aluminum processing operations which treat molten aluminum with gaseous chlorine.

In accordance with one aspect of the present invention, particulates of less than 0.5 microns in size are removed from gaseous effluents by contacting the effluent with a solid, inorganic, strongly adsorbent material.

Such strongly adsorbent materials may include calcium sulfate, zeolite molecular sieves, dicalcium orthophosphate, clays, and slates.

In accordance with a particularly advantageous aspect of the present invention, entrained metal halide solids of less than 0.1 microns in size are effectively removed from the flue gas of an aluminum processing operation which utilizes or employs a gaseous chlorine treatment of molten aluminum by passing the flue gas through a bed of calcium sulfate in its hemihydrate or anhydrous form.

An essential feature of the present invention is the surprising discovery that solid highly adsorbent materials such as calcium sulfate are effective in removing aerosol-sized particulates such as the metal halide solids entrained in flue gases from aluminum furnaces. Heretofore, it was widely believed that solid adsorbents would be generally ineffective in removing submicron particulates (except possibly at prohibitively high pressure drops with concomittant high energy requirements) and that liquid absorbents, such as caustic or alkaline solutions (which still can allow white smoke and also require high energy expenditures), were needed.

Other objects, aspects and advantages of the present invention will become apparent to one skilled in the art in view of the following description of the preferred embodiments when read in conjunction with the accompanying drawings.

BRIEF DESCRIPTION OF THE DRAWINGS

FIG. 1 is a view in elevation, partly diagrammatic and partly in section, illustrating a solid adsorbent tray scrubber unit in conjunction with a secondary aluminum processing operation; and FIG. 2 is a view in elevation, partly diagrammatic and partly in section, illustrating a solid adsorbent bag scrubber unit for gaseous effluent.

DESCRIPTION OF PREFERRED EMBODIMENTS

Referring to FIG. 1, fumes consisting of hot gases and particulate matter issue from molten aluminum 1 in a secondary aluminum melting furnace 2. The aluminum melting furnace 2 comprises a combustion chamber 3 and an open hearth 4 where aluminum scrap or the like can be placed into the furnace. A burner 5 in the combustion chamber 3 is used to maintain the metal above its melting point and to maintain a reducing (non-oxidizing) atmosphere over the molten metal. A layer 6 of flux material such as a NaCl·KCl eutectic composition may be provided to prevent the formation of oxides and to absorb or gather impurities released from the metal during processing. A gaseous chlorine distributing pipe 7 may be immersed into the melt 1 at the open hearth section 4. The gaseous chlorine is supplied to the pipe 7 from a pressure vessel (not shown) through a flexible conduit 8. A suitable valve (not shown) in line 8 may permit metering of the amount of gaseous chlorine fed into the melt 1. A hood 9 is provided to direct fumes from the open hearth into a flue duct 10. Similarly, fumes from the combustion chamber 3 are directed through a duct 11 into flue duct 10. The fumes may be passed via ducts 10 and 11 through a preliminary filter unit 14 which may be composed of baffled foraminous trays 15 of, for example, 100 mesh silica sand, 1 to 50 cm. deep, whereby soot, organic matter, and other coarse particulates generally having a particle size greater than about one micron may be removed. Thereafter, the filtered flue gas may be passed through a solid adsorbent unit 16 which may be composed of baffled foraminous trays 17 containing particulate highly adsorbent material such as calcium sulfate or zeolite A at a bed depth of, for example, 5 to 50 cm. Thereafter, the flue gas may be passed into a natural draft stack 20. A blower 19 may be provided to maintain a flue gas flow rate of, for example, about 1,000 to 1,000,000 liters per minute.

Generally, the temperatures of fumes issuing from the aluminum furnace 2 will range from about 80°C C. the open hearth section 4 to about 800°C in the combustion chamber 3. Therefore, if the flue gas temperature immediately upstream of the preliminary filter unit 14 is still relatively high, e.g., 500°C, a damper 18 may be provided in the flue duct 10 to mix or bleed-in a gas, such as air, at a lower temperature, conveniently ambient temperature, e.g., 25°C.

Referring to FIG. 2, as an alternative or in conjunction with the solid adsorbent tray unit 16 shown in FIG. 1, a solid adsorbent bag unit 30 composed of several inverted bags 31 supported on a reticulated framework (not shown) may be used. The bags themselves may be of any woven or non-woven textile material such as cotton which is capable of withstanding the temperatures of the flue gas which may enter at inlet port 32, pass up through the bags 31 and through outlet port 33 to the stack. The solid adsorbent material may be applied to the bags 31 in a number of ways. For example, the bags may be made of quilted material, i.e., two layers of stiched cloth, with the solid adsorbent material as a filling being held between the layers by the stitching. Alternatively, the solid adsorbent material may be dispersed in an aqueous medium to a paste-like consistency and then coated onto the interior of the bags 31.

The solid adsorbent materials found useful in the present invention exhibit high affinities for particulates or solids of less than 0.5 microns in size, e.g., 0.001 to 0.05 microns, and have particularly high affinities for particulates less than 0.1 microns in size.

Of particular usefulness is calcium sulfate which may be represented by the formulas $CaSO_4$; $CaSO_4 \cdot 2H_2O$ and $CaSO_4 \cdot \frac{1}{2}H_2O$. Calcium sulfate occurs in nature as anhydrite and in hydrated form as gypsum. It is also derived as a by-product in many chemical operations and may be obtained commercially in technical, pure precipitated and F.C.C. grades. Calcium sulfate in its pure anhydrous form is typically a white odorless powder or crystals, and has a melting point of about 1450°C. The dihydrate loses one and a half molecules of water at about 128°C and becomes anhydrous at about 163°C.

The hemihydrate, $CaSO_4 \cdot \frac{1}{2}H_2O$, and anhydrous calcium sulfate have been found to be particularly effective in removing metal halide solids of less than 0.1 microns from flue gases issuing from aluminum processing operations.

Other materials found to be effective in the present invention are the zeolitic molecular sieves.

Zeolites are metal alumino-silicates which exist in crystalline form. Only the crystalline zeolites having the basic formula:

$$M_{2/n}O:Al_2O_3:xSiO_2:yH_2O$$

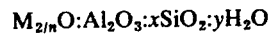

where M represents an exchangeable cation and n its valence, are termed zeolitic molecular sieves. In general, a particular crystalline zeolite will have values for $x$ and $y$ that fall within a definite range.

The fundamental "building block" of any zeolite crystal is a tetrahedron of four oxygen ions surrounding a smaller silicon or aluminum ion. Each of the oxygen ions has two negative charges; each silicon ion has four positive charges; each aluminum ion three. A silicon thus takes on a "half interest" in the eight charges of the four oxygens which surround it. Each oxygen retains one negative charge which enables it to combine with another silicon or aluminum ion and extend the crystal lattice in all directions. The aluminum ion, with one less positive charge than the silicon, can only satisfy three negative charges of the four oxygens which surround it. To produce a stable crystal structure, it must have the help of another positively charged ion. This is the function of the exchangeable cation M.

The structure of most crystals extends uniformly in all directions without leaving empty spaces. In zeolitic molecular sieves, however, the framework of silicon-oxygen and aluminum-oxygen tetradedra forms a structure which is honeycombed with relatively large cavities which are normally filled with water molecules. The size and shape of these cavities depends on the variety of the zeolite.

The zeolitic molecular sieves as described above may be activated by heating to effect the loss of water of hydration. The dehydration results in crystals interlaced with channels of molecular dimensions that offer very high surface areas.

The zeolites occur as agglomerates of fine crystals or are synthesized as fine powders and are preferably tableted or pelletized for use in the present invention.

Known naturally occurring crystalline zeolitic molecular sieve materials which may be useful as the solid adsorbent material in the present invention include analcite, erionite, chabazite, faujasite, ad mordenite which are widely known and described in the art.

Known synthetic zeolitic materials effective in the process of the present invention include hydrated sodium and calcium alumino-silicates of the above general formula where M generally represents sodium or calcium. However, the sodium or calcium may be replaced in whole or in part by other alkali or alkaline earth metal ions such as lithium, potassium, rubidium, cesium, beryllium, magnesium, strontium or barium.

Suitable synthetic molecular sieve materials may include zeolites A, D, L, R, S, T, X, and Y.

The pore size of the zeolitic molecular sieves may be varied by employing different metal cations. For example, sodium zeolite A has a pore size of about 4 angstrom units whereas when calcium cations have been exchanged for at least about 40 percent of the sodium cations calcium zeolite A has a pore size of about 5 angstrom units.

Zeolite A is a crystalline zeolitic molecular sieve which may be represented by the formula:

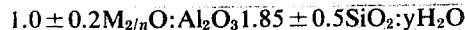

$$1.0 \pm 0.2 M_{2/n}O : Al_2O_3 1.85 \pm 0.5 SiO_2 : yH_2O$$

wherein M represents a metal, n is the valence of M, and y may have any value up to about 6. The as-synthesized zeolite A contains primarily sodium ions and is designated sodium zeolite A.

Zeolite A is described in greater detail in U.S. Pat. No. 2,882,243, while zeolite X is described in U.S. Pat. No. 2,882,244. Zeolite Y is described in U.S. Pat. No. 3,130,007, and zeolite R in U.S. Pat. No. 3,030,181. Zeolites D and T are described in U.S. Pat. Nos. 3,069,362 and 2,950,952, respectively. The disclosures of the above patents are incorporated herein by reference.

Sodium zeolite A with a pore size of about 4 angstrom units such as "Linde 4A" molecular sieve available from Union Carbide Corp. may be preferred for the removal of metal halide particulates of less than 0.1 micron in size from flue gases of aluminum processing operations.

Another material found to be effective in the present invention is dicalcium orthophosphate, sometimes referred to as dibasic calcium phosphate, secondary calcium phosphate, or bicalcium phosphate. Dicalcium orthophosphate occurs as a double hydrate, $CaHPO_4 \cdot 2H_2O$, and in anhydrous form, $CaHPO_4$, which is preferred. Dicalcium orthophosphate may be made or derived by the interaction of fluorine-free phosphoric acid with milk of lime, and is available in U.S.P. XVII, F.C.C., dentifrice and feed grades. Dicalcium orthophosphate in its pure form is a white tasteless crystalline powder which typically loses water at about 109°C.

Clay has also been found to be effective in the present invention.

The term "clay" is used as a general term for a great variety of aluminum silicate-bearing rocks of various compositions and degrees of purity. Typical minerals comprising the major proportion of any clay include kaolinite, halloysite, montmorillonite, and illite. In addition, clays usually contain other minerals such as quartz, calcite, limonite, gypsum, and muscovite. Typically, clay is formed by the weathering of aluminum-bearing rocks, such as granite or other igneous rocks containing feldspar.

Among the more important varieties of clays, kaolin or china clay, and bentonite may be preferred. Kaolin clay has been found to be particularly effective.

Other materials found to be effective in the present invention include slates, which typically are fine grained metamorphic rock materials composed of micas, chlorite, quartz, hematite, clays, and other minerals. Slate occurs naturally in Pennsylvania, Vermont, Maine, Virginia, Colorado, California, and in Europe. Dehydrated slate, i.e., slate essentially free of water, has been found to be particularly effective.

In general, any of the widely known gas-solid contacting procedures or methods which will intimately contact or mix the flue gas or gaseous effluent with the solid adsorbent material may be sufficient to remove the aerosol-sized particulates.

For example, intimate contacting of the gaseous effluent and the solid adsorbent material may be achieved by using semicontinuous units involving fixed beds of the adsorbent through which the flue gases pass; continuous units which provide for countercurrent or cocurrent movement of solid adsorbent material and flue gas, or, if desired, batch units.

Preferably, semicontinuous units involving fixed or stationary beds, with the solid adsorbent material in granular form placed on one or more trays or columns, are used.

If more than one bed of solid adsorbent material is used, the bed may be placed in a series or a parallel arrangement, or in combination of both.

When the solid adsorbent material is used in granular form, the size of the granules or particles may be from about 100 to 10,000 microns (1 cm.), and more typically about 300 to 5,000 microns.

When the solid adsorbent material is used in granular form, bed depth may be from about 1 cm. to about 100 cm., and more typically about 5 cm. to about 50 cm.

Of course, the pressure drop across the bed of solid adsorbent material is as small as possible, preferably less than about 1 cm. of mercury, but which may be higher, e.g., from above 1 cm. mercury to about 10 cm. mercury if desired.

The flue gas may be passed through a static or fixed bed of the solid adsorbent material and under fluidizing or non-fluidizing conditions.

To avoid or substantially lessen the possibility of the flue gas picking up or having entrained therein particles of the solid adsorbent material, non-fluidizing conditions are preferred.

Mixed beds of the solid adsorbent material are also contemplated. For example, the flue gas may first be passed through a bed of calcium sulfate and thereafter be passed through a bed of zeolitic molecular sieve material. Or, the flue gas may be passed through one or more beds, each containing a mixture, e.g., 50 percent calcium sulfate, 50 percent sodium zeolite A, of solid adsorbent material.

The beds of the solid adsorbent material may also contain an acid-removing material such as calcium hydroxide, calcium oxide, calcium carbonate, or sodium carbonate, the acid-removing material being admixed with the calcium sulfate or other solid adsorbent material of the present invention for the purpose of removing at least a portion of any acid gases such as hydrogen chloride or hydrogen fluoride which may be present in the flue gas.

The flue gas may be contacted with the solid adsorbent material at any temperature at which the solid adsorbent material is sufficiently active to remove the aerosol-sized particulates. Typically, the solid adsorbent material is contacted at flue gas temperatures which may range from several hundred degrees, e.g., 500°C, near the furnace or melt, to more near ambient temperature, e.g., 100°C, near the top of the stack or end of the flue.

Preferably, the flue gas temperature at about the point of initial contact with the solid adsorbent material is from above about 100°C. to below about 200°C, typically about 110°C to about 170°C.

In the range of 110°C to 170°C, calcium sulfate in its hemihydrate and anhydrous forms has been found to be particularly effective in removing metal halide solids of less than 0.1 microns from gaseous effluents, i.e., flue gases, issuing or resulting from aluminum processing operations which utilize a gaseous chlorine treatment of molten aluminum.

The quantity of aerosol-sized metal halide particulates in the gaseous effluent of aluminum processing furnaces may vary widely depending upon, for example, whether or not chlorination of the impure aluminum is actually occurring, chlorination conditions, and similar factors. The quantity at any given time may range, for example, from 2 to 20,000 ppm.

Scrubbing the gaseous effluent with the solid adsorbent materials of the present invention may remove at least about 50 percent, and more typically at least about 90 percent, of the aerosol-sized metal halide particulates.

The gaseous effluent being treated may also contain gross contaminants, such as inorganic salts and oxides, soot, and organic material comprising particulates greater than 0.5 microns in size. Such gross contaminants, which typically are greater than one micron in size, may be removed by one or more coarse adsorbents, screens, or filters, e.g., fixed beds of sand, cloth screens, low energy liquid scrubbers, or cyclone separators. Such gross contaminants are preferably removed prior to contacting the flue gas with the solid adsorbent material.

As indicated above, hydrogen chloride, hydrogen fluoride, and chlorine gas may also be present in the gaseous effluent of aluminum processing furnaces. Such potential pollutants may also be removed by "wet" scrubbing the gaseous effluent with aqueous alkaline solutions or the like, either prior or subsequent to contacting the gaseous effluent with the solid adsorbent material, but prior to expelling or venting the flue gas to the atmosphere.

Such wet scrubbers are described, for example, in "Gas Collection, Cleaning and Control at Lako Lundsvall Works" E.M. Brenner, paper number A70-14; and "Systems for Gas Collection and Cleaning in Electrolytic Cells of Montecatini Edison Aluminum Plants", G. Callaioli et al, paper number A70-23, which were presented at the Feb. 16–19, 1970 meeting of the Metallurgical Society of the A.I.M.E. at Denver, Colorado, and are available from the Metallurgical Society of the A.I.M.E., 345 East 47th Street, New York, N.Y. 10017. Both of these papers are incorporated herein by reference.

For further description of details of typical solids-fluids containing equipment and general engineering design considerations, including a discussion of gas-solids fluidized and non-fluidized systems, various known types of bag filters, coarse granular bed filters, and other screening techniques, see Perrys' Chemical Engineers Handbook, McGraw-Hill, 4th Ed. (1963), which is incorporated herein by reference.

The mesh or particle sizes referred to herein are based on the U. S. Sieve Series (ASTM E-11-61), with International Test Sieve Series (in microns) equivalents also being given whever possible. Whenever a plus mesh-minus mesh designation is given, the material passing through one screening surface (minus mesh) and/or being retained on another screening surface (plus mesh) is the material so identified.

The present invention is further illustrated by the following examples; all parts, percentages and ratios in the examples as well as in other parts of the specification and in the claims are by weight unless otherwise indicated:

EXAMPLE I

Gaseous effluent from the open hearth and the combustion chamber portions of a secondary aluminum furnace was withdrawn from the flue stack and was passed at a temperature of about 110°C and at a flow rate of about 3,250 liters per minute (1/min) through a tray scrubber unit consisting in series of a fixed tray containing a 5 cm. deep bed of 100 mesh silica sand and three fixed trays each containing a 5 cm. deep bed of +40/−20 mesh calcium sulfate hemihydrate.

Samples of the gaseous effluent were simultaneously taken from ports located upstream and downstream of the tray scrubber unit using Gilman type A filter pads to collect any aerosol-sized particles in the sample.

The Gilman type A filter pads are manufactured from microsized filaments of glass and are treated in a muffle furnace to remove any trace amounts of organic fiber contaminant. These filters are tested to a minimum 99.7 percent collection efficiency for particles larger than 0.3 microns as measured by the Dioctyl Phthalate Penetration (DOP) test. The efficiency of these filter pads is greater than 98 percent for particles as small as 0.05 microns, and is correspondingly lower for more minute particles.

The results of a chloride analysis obtained from the samples taken were as follows:

| Before Scrubber Unit | After Scrubber Unit |
|---|---|
| 1.37 $\mu$ g/l (micrograms of chlorides per liter) | 0.0 $\mu$ g/l |

The chloride analysis was conducted using an Orion model 96-17 combination chloride electrode system. This electrode is described in form DS96-17/863 available from Orion Research Incorporated, Cambridge, Massachusetts. The chloride analysis involved placing the filter pad containing the sample in 10 ml of deionized water at approximately 25°C, and inserting the chloride electrode into the solution and obtaining a reading of the chloride concentration from a previously calibrated specific ion meter.

EXAMPLE II

Example I was repeated except that the flow rate of gaseous effluent through the tray scrubber unit was about 2,800 1/min, with the pressure drop across the unit being about 0.6 to 1.3 cm. of mercury. The efficiency of removal of aerosol-sized particles was determined visually by drawing sidestreams of the gas through cloud chambers preceeding and following the scrubber unit. During 76 hours of operation, no fog or white smoke was seen in the chamber following the scrubber unit while white smoke was frequently observed in the chamber preceding the scrubber unit. At periodic intervals, samples of gaseous effluent were simultaneously taken upstream and downstream of the scrubber unit. Chloride analysis revealed that the chloride content of the gaseous effluent entering the scrubber unit varied from 1 to 20 $\mu$g/l while no chloride particulates could be detected in the treated gas leaving the scrubber unit.

EXAMPLE III

A run was conducted in which the scrubber unit consisted of a single fixed tray containing a bed 33 cm. deep of calcium sulfate hemihydrate of 10 mesh size. The source of the gaseous effluent was a simulated secondary aluminum processing furnace comprising a natural gas-fired vessel containing sodium chloride-potassium chloride flux material. The temperature of the gaseous effluent passing through the bed was about 170°C, while the flow rate was such that the pressure drop across the bed varied from 1.3 to 5 cm. mercury. After four hours of operation, chloride analysis of samples taken as in Example I showed the following results:

| Before Scrubber Unit | After Scrubber Unit |
|---|---|
| 296 µg/l | 8 µg/l |

EXAMPLE IV

Example III was repeated except that a bed 50 cm. deep of calcium sulfate dihydrate (gypsum) of 10 mesh size was used. The temperature of the gaseous effluent passing through the bed was about 110°C and the pressure drop across the scrubber unit varied from 3.8 to 6.4 cm. mercury. After four hours of operation, chloride analysis of samples taken as in Example I showed the following results:

| Before Scrubber Unit | After Scrubber Unit |
|---|---|
| 50 µg/l | 0.25 µg/l |

EXAMPLE V

Example III was repeated except that Linde 4A sodium zeolite A having a nominal pore diameter of 4 angstroms was used. The zeolite A was in 0.32 cm. pellet form and was used at a bed depth of 30 cm. After one hour of operation, a chloride analysis of samples taken as in Example I showed the following results:

| Before Scrubber Unit | After Scrubber Unit |
|---|---|
| 210 µg/l | 64 µg/l |

EXAMPLE VI

Example III was repeated except that dicalcium orthophosphate of −8/+40 mesh size was used. The temperature of the gaseous effluent passing through the bed was about 120°C, and the pressure drop across the scrubber unit was about 0.9 cm. mercury. The efficiency of removal of aerosol-sized particles was determined visually as in Example II by drawing sidestreams of the gas through cloud chambers preceding and following the scrubber unit. During operation, no fog or white smoke was seen in the chamber following the scrubber unit while white smoke was frequently observed in the chamber preceding the scrubber unit.

EXAMPLE VII

Example VI was repeated except that a bed approximately 23 cm. deep of kaolin clay of approximately −8/+40 mesh size was used. The temperature of the gaseous effluent passing through the bed was about 140°C and the pressure drop across the scrubber unit was approximately 0.8 cm. mercury. During operation, no fog or white smoke was seen in the chamber following the scrubber unit while white smoke was frequently observed in the chamber preceding the scrubber unit.

EXAMPLE VIII

Example VI was repeated except that a bed approximately 23 cm. deep of dehydrated slate of approximately −10/+30 mesh size was used. The temperature of the gaseous effluent passing through the bed was about 150°C, and the pressure drop across this scrubber unit was about 1.5 cm. mercury. During operation, no fog or white smoke was seen in the chamber following the scrubber unit while white smoke was frequently observed in the chamber preceding the scrubber unit.

The following comparison runs illustrate the superiority of the solid adsorbents of the present invention compared to materials such as coke, active carbon and lime.

Comparison Run A

Example III was repeated except that coke of −20/+40 mesh size was used. White smoke was frequently observed in both the cloud chambers mounted before and after the scrubber unit.

Comparison Run B

Comparison Run A was repeated except that active carbon of −325 mesh size and U.S.P. grade was used. White smoke was frequently observed in both the cloud chambers mounted before and after the scrubber unit.

Comparison Run C

Comparison Run A was repeated except that calcium oxide (lime) of −200 mesh size was used. White smoke was frequently observed in both the cloud chambers mounted before and after the scrubber unit.

Comparison Run D

Comparsion Run A was repeated except that the gaseous effluent was passed upwardly through a 5 percent aqueous solution of sodium carbonate instead of through the tray scrubber. White smoke was frequently observed in both the cloud chambers mounted before and after the scrubber unit.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A process for the prevention of air pollution by the removal of particulates of less than 0.5 microns in size from gaseous effluents, which process comprises contacting the effluent with a solid adsorbent material selected from the group consisting of calcium sulfate, zeolitic molecular sieves, dicalcium orthophosphate, clays and slates and mixtures thereof.

2. The process of claim 1 wherein the solid adsorbent material is calcium sulfate hemihydrate or anhydrous calcium sulfate.

3. The process of claim 1 wherein the solid adsorbent material is zeolite A.

4. The process of claim 1 wherein the solid adsorbent material is anhydrous dicalcium orthophosphate.

5. The process of claim 1 wherein the solid adsorbent material is a clay selected from the group consisting of kaolin and bentonite.

6. The process of claim 1 wherein the solid adsorbent material is dehydrated slate.

7. A process for the prevention of air pollution by the removal of metal halides having a particle size of between about 0.001 to 0.5 microns from a flue gas of an aluminum processing operation, which process comprises intimately contacting the flue gas at a temperature from above about 100°C to below about 200°C with a solid adsorbent material selected from the group consisting of calcium sulfate, zeolite A, dicalcium orthophosphate, kaolin clay and dehydrated slate and mixtures thereof.

8. The process of claim 7 wherein the temperature is from about 110°C to about 170°C and wherein the solid adsorbent material is in granular form with the size of the granules ranging from about 100 to 10,000 microns.

9. The process of claim 7 wherein the flue gas is passed through a bed of anhydrous calcium sulfate or calcium sulfate hemihydrate in granular form.

10. The process of claim 7 wherein the flue gas is passed through a bed of sodium zeolite A in granular form.

11. The process of claim 7 further comprising removing entrained solids having a particle size greater than one micron prior to passing the flue gas into contact with the solid adsorbent material, and at a point prior to expelling the flue gas into the atmosphere, removing hydrogen chloride, hydrogen fluoride, chlorine gas from the flue gas.

12. The process of claim 7 wherein the flue gas contains from about 2 to 20,000 ppm of the metal halides and wherein the flue gas is intimately contacted with the solid adsorbent material to remove at least about 50 percent of the metal halides.

13. An air pollution control process for the prevention of white smoke in the atmosphere and caused by finely divided metal halide solids having a particle size of less than 0.1 microns from a gaseous effluent of an aluminum processing operation utilizing a gaseous chlorine treatment of molten aluminum, which process comprises treating the gaseous effluent to remove entrained solids having a particle size greater than one micron; and passing the treated effluent into intimate contact with and through a bed of granular calcium sulfate at a temperature between about 110°C and about 170°C to remove a quantity of the metal halide solids having a particle size of less than 0.1 microns at least sufficient to prevent formation of the white smoke.

14. The process of claim 13 wherein the calcium sulfate granules have a size of from about 300 to 5,000 microns, and wherein the bed depth is about 5 to 50 centimeters.

15. The process of claim 13 further comprising treating the gaseous effluent to remove hydrogen chloride, hydrogen fluoride and chlorine gas.

* * * * *